United States Patent
Xia

(10) Patent No.: US 10,977,650 B2
(45) Date of Patent: Apr. 13, 2021

(54) INFORMATION TRANSMISSION METHOD, APPARATUS AND SYSTEM

(71) Applicant: Tencent Technology (Shenzhen) Company Limited, Shenzhen (CN)

(72) Inventor: Dongming Xia, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1056 days.

(21) Appl. No.: 14/446,243

(22) Filed: Jul. 29, 2014

(65) Prior Publication Data

US 2015/0120574 A1 Apr. 30, 2015

Related U.S. Application Data

(63) Continuation of application No. PCT/CN2014/077083, filed on May 8, 2014.

(30) Foreign Application Priority Data

Oct. 30, 2013 (CN) .......................... 201310529492.9

(51) Int. Cl.
*G06Q 20/40* (2012.01)
*G06Q 20/32* (2012.01)
(Continued)

(52) U.S. Cl.
CPC ... *G06Q 20/40145* (2013.01); *G06Q 20/3274* (2013.01); *G06Q 20/3276* (2013.01);
(Continued)

(58) Field of Classification Search
CPC ................................ G16Y 10/45; G16Y 20/40
See application file for complete search history.

(56) References Cited

U.S. PATENT DOCUMENTS 8,807,426 B1* 8/2014 Dollard ................. G06Q 20/40
235/380
9,715,686 B2* 7/2017 Sadacharam ...... G06Q 20/3276
(Continued)

FOREIGN PATENT DOCUMENTS

CN         1641653 A    *   7/2005
CN         1928907 A        3/2007
(Continued)

OTHER PUBLICATIONS

Masalha et al., A Students Attendance System Using QR Code, (IJACSA) International Journal of Advanced Computer Science and Applications, vol. 5, No. 3, 2014. www.ijacsa.thesai.org. (Year: 2014).*

(Continued)

*Primary Examiner* — El Mehdi Oussir
(74) *Attorney, Agent, or Firm* — Morgan, Lewis & Bockius LLP

(57) ABSTRACT

Methods and devices for information transmission and in particular for payment transfer from a paying terminal to a selling terminal. In some embodiments, the paying terminal scans an encrypted image, such as a two-dimensional code, displayed on the selling terminal. The paying terminal decrypts the encrypted image to obtain payment information and sends a payment request to a remote server for processing. Security verifications can be conducted by the paying terminal or the server, wherein the server may generate processing results approving or denying the payment request. When the payment amount is greater than a preset value, additional verification can be carried out using, e.g., biometric information. The paying terminal and/or the selling terminal then display the processing results and the remote server completes the payment transfer.

14 Claims, 10 Drawing Sheets

(51) Int. Cl.
  *G06Q 20/36*  (2012.01)
  *G16Y 10/45*  (2020.01)
  *G16Y 20/40*  (2020.01)

(52) U.S. Cl.
  CPC .......... *G06Q 20/3674* (2013.01); *G16Y 10/45* (2020.01); *G16Y 20/40* (2020.01)

(56) References Cited

U.S. PATENT DOCUMENTS

| | | | | |
|---|---|---|---|---|
| 9,773,277 | B2* | 9/2017 | He | G06Q 40/02 |
| 2005/0097037 | A1* | 5/2005 | Tibor | H04L 63/0861 |
| | | | | 705/39 |
| 2005/0156318 | A1* | 7/2005 | Douglas | G06K 19/18 |
| | | | | 257/761 |
| 2011/0191161 | A1* | 8/2011 | Dai | G06Q 20/3274 |
| | | | | 705/14.38 |
| 2011/0191244 | A1* | 8/2011 | Dai | G06Q 20/40 |
| | | | | 705/44 |
| 2011/0191252 | A1* | 8/2011 | Dai | G06Q 20/322 |
| | | | | 705/71 |
| 2012/0066120 | A1* | 3/2012 | Ringewald | G06Q 20/12 |
| | | | | 705/40 |
| 2012/0116861 | A1* | 5/2012 | Dobyns | G06Q 30/0236 |
| | | | | 705/14.34 |
| 2012/0129450 | A1* | 5/2012 | Lee | H04M 1/72412 |
| | | | | 455/41.1 |
| 2012/0185398 | A1* | 7/2012 | Weis | G06Q 20/401 |
| | | | | 705/75 |
| 2012/0310832 | A1* | 12/2012 | Hammad | G06Q 20/32 |
| | | | | 705/44 |
| 2013/0006847 | A1* | 1/2013 | Hammad | G06Q 20/32 |
| | | | | 705/39 |
| 2013/0013490 | A1* | 1/2013 | Keller | G06Q 20/353 |
| | | | | 705/39 |
| 2013/0024379 | A1* | 1/2013 | Di Tucci | G06Q 20/32 |
| | | | | 705/44 |
| 2013/0124412 | A1* | 5/2013 | Itwaru | G06Q 20/20 |
| | | | | 705/44 |
| 2013/0332365 | A1* | 12/2013 | Evans | G07F 7/088 |
| | | | | 705/44 |
| 2014/0100973 | A1* | 4/2014 | Brown | G06Q 20/3274 |
| | | | | 705/17 |
| 2014/0263623 | A1* | 9/2014 | Robison | G06Q 20/3274 |
| | | | | 235/380 |
| 2014/0302915 | A1* | 10/2014 | Lyons | G07F 17/3237 |
| | | | | 463/25 |
| 2015/0006386 | A1* | 1/2015 | Tebbe | G06Q 20/326 |
| | | | | 705/44 |
| 2015/0039517 | A1* | 2/2015 | Liberty | G06Q 20/3227 |
| | | | | 705/67 |
| 2016/0042350 | A1* | 2/2016 | Puura | H04W 12/06 |
| | | | | 705/44 |
| 2020/0242585 | A1* | 7/2020 | Meere | G06Q 20/401 |

FOREIGN PATENT DOCUMENTS

| | | | |
|---|---|---|---|
| CN | 102651107 A | 8/2012 | |
| CN | 102868688 A | 1/2013 | |
| CN | 102915496 A | 2/2013 | |
| CN | 103269328 A | 8/2013 | |
| EP | 3365852 A1 * | 8/2018 | ......... G06Q 20/3274 |

OTHER PUBLICATIONS

Tencent Technology, ISRWO, PCT/CN2014/077083, Aug. 13, 2014, 7 pgs.
Tencent Technology, IPRP, PCT/CN2014/077083, May 3, 2016, 5 pgs.

* cited by examiner

INFORMATION TRANSMISSION METHOD, APPARATUS AND SYSTEM

RELATED APPLICATIONS

This application is a continuation application of PCT Patent Application No. PCT/CN2014/077083, entitled "INFORMATION TRANSMISSION METHOD, APPARATUS AND SYSTEM" filed on May 8, 2014, which claims priority to Chinese Patent Application No. 201310529492.9, "Information Transmission Method, Apparatus and System," filed on Oct. 30, 2013, both of which are hereby incorporated by reference in their entirety.

FIELD OF THE INVENTION

The present application relates to the field of Internet technologies, and in particular, to an information transmission method, apparatus and system.

BACKGROUND OF THE INVENTION

With the development of network technologies, online payment becomes more and more popular, and people often complete transactions and purchases by means of online payment. In current online payment technology, a selling terminal or a transaction platform server sends payment information to a paying terminal, and after acquiring the payment information, the paying terminal completes payment through a bank server. With the development of network technologies, hacking technologies also become more advanced. When a selling terminal or a transaction platform server sends payment information to a paying terminal via a network, hackers may be able to replace the payment information, causing the paying terminal to conduct payment according to the fake payment information. Thus, the current payment technology does not have a high safety level.

SUMMARY

The above deficiencies and other problems associated with the existing technology are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a paying terminal to conduct a payment transfer from the paying terminal to a selling terminal. The paying terminal may obtain an encrypted image from the selling terminal, wherein the encrypted image encrypts payment information and the payment information comprises a selling account identifier and a payment amount. After decrypting the encrypted image to acquire the payment information, the paying terminal may acquire biometric information from a user of the paying terminal when the payment amount is greater than a preset value. Furthermore, the paying terminal may send a payment request to a remote server based on the payment information, wherein the payment request comprises the payment information, a paying account identifier and verification information associated with the paying account identifier. After receiving processing results from the remote server, wherein the processing results are generated by the remote server based on the payment request, the paying terminal may display the processing results.

Another aspect of the invention involves a paying terminal. The paying terminal includes memory, one or more processors, and one or more program modules stored in the memory and configured for execution by the one or more processors. The one or more program modules include: an acquiring module configured to obtain an encrypted image from a selling terminal, wherein the encrypted image encrypts payment information and the payment information comprises a selling account identifier and a payment amount, a decrypting module configured to decrypt the encrypted image to acquire the payment information, a determination module configured to determine whether payment amount is greater than a preset value, wherein the acquiring module is further configured to acquire biometric information from a user of the paying terminal when the payment amount is greater than the preset value, a sending module configured to send a payment request to a remote server based on the payment information, wherein the payment request comprises the payment information, a paying account identifier and verification information associated with the paying account identifier; and a receiving module configured to receive processing results from the remote server and display the processing results, wherein the processing results are generated by the remote server based on the payment request.

Another aspect of the invention involves a non-transitory computer readable storage medium having stored therein instructions, which when executed by a computer system, e.g. a paying terminal, cause the computer system to: obtain an encrypted image from a selling terminal, wherein the encrypted image encrypts payment information and the payment information comprises a selling account identifier and a payment amount, decrypt the encrypted image to acquire the payment information; when the payment amount is greater than a preset value, acquire biometric information from a user of the paying terminal; send a payment request to a remote server based on the payment information, wherein the payment request comprises the payment information, a paying account identifier and verification information associated with the paying account identifier; receive processing results from the remote server, wherein the processing results are generated by the remote server based on the payment request; and display the processing results.

Some embodiments may be implemented on either the terminal side or the server side of a terminal-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
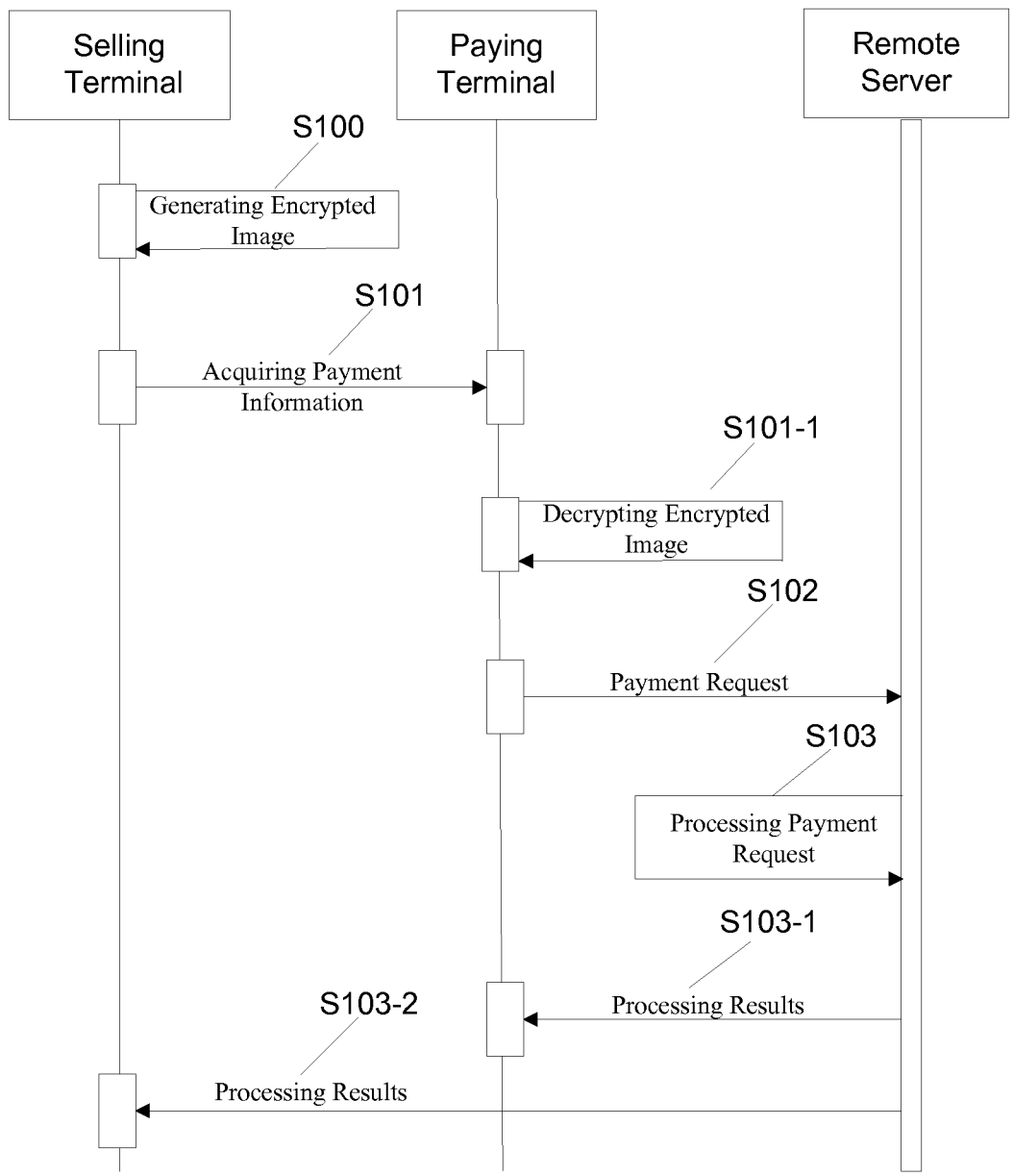
FIG. 1 is a schematic illustration of an information transmission method, showing how a paying terminal, a selling terminal, and a server interact according to some embodiments of the present application.

Referring to FIG. 1, FIG. 1 is a schematic illustration of an information transmission method, showing how a paying terminal, a selling terminal, and a server interact according to some embodiments of the present application. As shown in FIG. 1, the method may include the following steps:

S100: A selling terminal may generate an encrypted image, which encrypts information such as a selling account identifier and payment information related to a financial transaction. The encrypted image may be generated with an application program installed on the selling terminal. In some embodiments, the encrypted image may be generated by devices other than the selling terminal.

S101: A paying terminal may acquire the encrypted image from the selling terminal. S101-1: The paying terminal may decrypt the encrypted image to acquire the payment information.

Encrypted images in the embodiments of the present application include, but are not limited to, two-dimensional codes, which may include two-dimensional stacked codes, two-dimensional row-column codes, two-dimensional matrix codes, or the like. In some embodiments, the encrypted images are three-dimensional codes.

In the embodiments of the present application, a selling terminal may be any device that is capable of displaying encrypted images and conducting communication. For example, the selling terminal maybe a tablet computer, a mobile phone, an e-reader, a remote control, a personal computer (PC), a notebook computer, on-board equipment, an Internet-enabled television, a wearable device, or other smart devices. The paying terminal may be any computational device having functions such as displaying encrypted images and conducting communication. For example, a paying terminal maybe a tablet PC, a mobile phone, an e-reader, a PC, a notebook computer, on-board equipment, an Internet-enabled television, a wearable device, or other smart devices.

In some embodiments, steps 101 and 101-1 may be as follows: the selling terminal displays the encrypted image, which encrypts payment information generated with an application program, e.g. a communication program; the paying terminal then acquires the encrypted image displayed by the selling terminal. The payment information may include a payment amount, or the payment information may include a payment amount and information related to a selling account, e.g. a selling account identifier such as an account number or account user's name and a pass code that may be used to identify the selling account. In some embodiments, when the payment information does not include the selling account identifier, the paying terminal may use information related to the application used to generate/display the encrypted image, wherein the information related to the application is included in the payment information. For example, the paying terminal may acquire a corresponding relationship between the selling account and the information related to the application, and then the paying terminal can identify the selling account by using the corresponding relationship. In some embodiments, the paying terminal does not identify the selling account; for example, the selling account may be identified by a bank server using a terminal identifier of the selling terminal when the bank server processes a payment request.

In some embodiments, the payment information may include the information related to specific merchandise; for example, when a user of the paying terminal chooses to purchase a product, the selling terminal can generate an encrypted image that encrypts payment information including information of the product, such as the name, item number, source, listing price, and other features of the product.

In some embodiments, the encrypted image may be displayed by the selling terminal and acquired by the paying terminal by scanning. In some embodiments, the encrypted image may be sent from the selling terminal to the paying terminal in a message or email or other file transfer technology.

S102: The paying terminal may send a payment request to a remote server, e.g. a bank server, based on the paying information, wherein the payment request comprises the payment information, a paying account identifier and verification information associated with the paying account identifier.

In some embodiments, when the paying terminal acquires the payment information, the paying terminal can acquire information related to a paying account, e.g. account number, and verification information related to the paying account, and then sends a payment request including the paying account identifier and the verification information related to the paying account to a bank server according to the payment information. For example, the paying terminal may send a payment request including the payment information, information related to the paying account, and verification information related to the paying account to the bank server.

In some embodiments, the paying account may be a paying account pre-stored on the paying terminal and automatically identified by the terminal. In some embodiments, the paying account may be identified by input from a user and the verification information related to the paying account may also be from the input of a user. In some embodiments, the paying account may be pre-stored on the paying terminal and the verification information may be from input of a user. The verification information related to the paying account may include information to be authenticated by the bank server when the paying account requests a transaction. For example, the verification information may include but not be limited to a password, an expiration date, and/or a card number.

In some embodiments, the payment request may be sent from the paying terminal to the bank server via a wired or wireless network.

In some embodiments, the paying terminal may also send the payment request including a paying account identifier and verification information related to the paying account to the bank server through a transaction server. For example, Step S102 may include: the paying terminal sending a payment request including a paying account identifier and verification information related to the paying account to a transaction server according to the payment information; and the transaction server sending the payment request to the bank server.

The transaction server and the bank server may be any computer having computational and networking capabilities. In some embodiments, the transaction server may be the server of an application software running on the paying terminal. For example, when the paying terminal acquires the encrypted image through certain communication software, e.g. a social networking software, and the paying account corresponds to a communication account registered in the communication software, the paying terminal can identify the paying account and verification information related to the paying account through the communication software, and then send a payment request including the paying account and the verification information related to the paying account to the transaction server according to the payment information, and the transaction server may send the payment request to the bank server.

In some embodiments, the payment request is forwarded between the transaction server and the bank server. Because it is generally more difficult to invade a server than a terminal, payment security can be improved.

S103: The bank server may process the payment request;
S103-1: the bank server may send processing results of processing the payment request to the paying terminal; and
S103-2: the bank server may send processing results of processing the payment request to the selling terminal.

In some embodiments, after the bank server receives the payment request, the bank sever can authenticate the verification information related to the paying account included in the payment request. For example, the bank server may compare the verification information with pre-stored verification information related to the paying account in the bank server; when a comparison result indicates that they are consistent, it is considered that the verification is successful and the processing results may include an approval if some other conditions can be met, e.g. the paying account having enough funds. A payment operation is performed when the processing results include an approval; for example, a payment amount in the paying account is transferred to the selling account. The selling account may be identified by a selling account identifier included in the payment request, or identified by the bank server according to a terminal identifier of the selling terminal.

In some embodiments, the bank server may send processing results of processing the payment request to the paying terminal and the selling terminal, wherein the paying terminal is identified by a paying terminal identifier and the selling terminal is identified by a selling terminal identifier. For example, the payment request may include a selling terminal identifier, or the payment request may include information related to the selling account, e.g. user name, and the bank server may identify the terminal identifier of the selling terminal by using the information related to the selling account.

Through the above steps, a paying terminal can acquire an encrypted image encoding payment information and displayed by a selling terminal; the selling terminal can send a payment request to a bank server according to the payment information included in the encrypted image, and the bank server can perform payment processing. That is, payment can be completed as long as the paying terminal acquires the encrypted image displayed by the selling terminal. For example, when a payer using the paying terminal purchases a certain article of merchandise from a seller using the selling terminal, the seller may control the selling terminal to display or send an encrypted image encoding payment information of the article, and the payer may control the paying terminal to acquire or receive the encrypted image; the paying terminal can send a payment request to the bank server according to the payment information included in the encrypted image, and the bank server can perform payment processing; when the selling terminal receives processing results including an approval, e.g. a payment complete message, the seller can deliver the article to the payer, thereby completing the purchase of the article. Therefore, the transaction can be completed quickly and conveniently while the transaction security is also ensured.

In some embodiments, a paying terminal acquires an encrypted image encoding payment information and displayed by a selling terminal, and decrypts the encrypted image to acquire the payment information; the paying terminal sends a payment request including a paying account identifier and verification information related to the paying account to a bank server according to the payment information; and the bank server processes the payment request and sends processing results of processing the payment request to the paying terminal and the selling terminal. In this way, payment information can be obtained by acquiring an encrypted image, and thus, compared with technology where payment information is acquired via a network, the embodiment of the present application can improve payment security.

Figure 2:
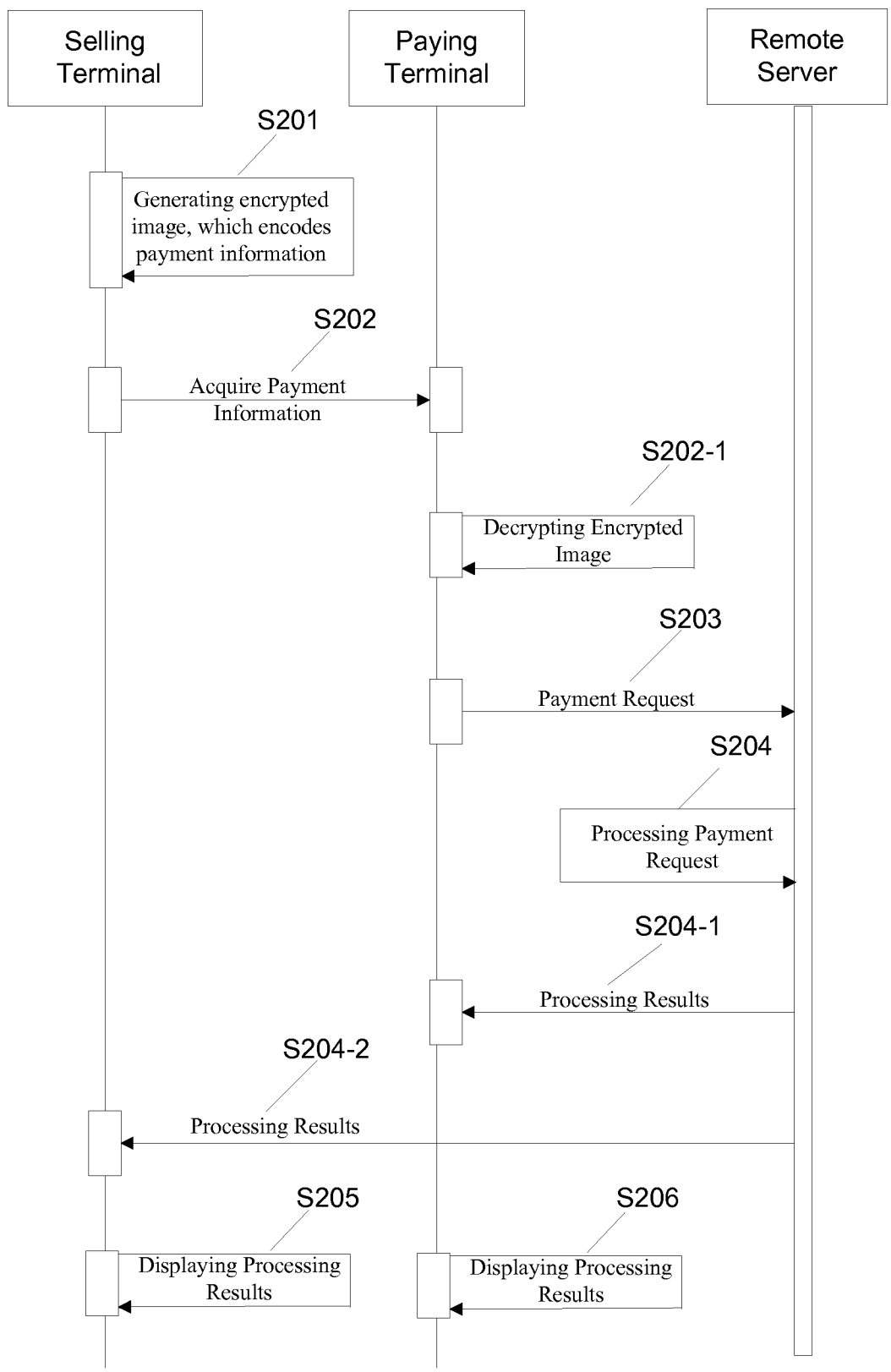
FIG. 2 is schematic illustration of an information transmission method, showing how a paying terminal, a selling terminal, and a server interact according to some embodiments of the present application.

Referring to FIG. 2, FIG. 2 is schematic illustration of an information transmission method, showing how a paying terminal, a selling terminal, and a server interact according to some embodiments of the present application. As shown in FIG. 2, the method includes following steps:

S201: A selling terminal may generate an encrypted image encoding payment information related to an article of merchandise, and displays the encrypted image.

In some embodiments, Step S201 shows that the paying information may be produced by receiving inputs from a user and an encrypted image may be generated wherein the encrypted image encrypts payment information corresponding to a target article. For example, according to a target article that a payer using a paying terminal chooses to purchase, a seller using the selling terminal controls the selling terminal to generate an encrypted image encoding payment information include information such as but not limited to payment amount, a selling account identifiers, an item code, and item description. In some embodiments, according to Step S201, the selling terminal may acquire, e.g. by scanning, a graphic code on the target article, and generate an encrypted image encoding payment information at least partly corresponding to the target article based on the information encrypted by the graphic code. The payment information corresponding to the target article may be payment information including a payment amount for the price of the target article. The payment information may also include other information related to the transaction.

In some embodiments, the selling terminal may generate the encrypted image through a specific application program, so as to generate the encrypted image quickly, and improve payment efficiency.

S202: A paying terminal may acquire the encrypted image from the selling terminal. S202-1: The paying terminal may decrypt the encrypted image to acquire the payment information.

S203: The paying terminal may send a payment request to a remote server, e.g. a bank server, based on the payment information, wherein the payment request comprises the payment information, a paying account identifier and verification information associated with the paying account identifier.

In some embodiments, the paying terminal may send a payment request including the payment information, a paying account identifier, and verification information associated with the paying account to the bank server, where the payment information may include a payment amount, information related to the article of merchandise, and a selling account identifier. Alternatively, the paying terminal may send a payment request including the payment information, a selling account identifier, a paying account identifier, and verification information associated with the paying account to the bank server, where the payment information may include a payment amount and information related to the article of merchandise, and the selling account identifier may be used to identify a selling account. For example, before a transaction between the paying terminal and the selling terminal, the paying terminal identifies a selling account by communicating with the selling terminal, or the paying terminal identifies the selling account by receiving inputs by a user.

In some embodiments, before Step S203, the paying terminal may identify the paying account and acquire at least part of the verification information associated with the paying account. For example, the paying account and the verification information may be pre-stored at the paying terminal. For example, the paying account and the verification information may be associated with/bound to a communication account of a communication software, e.g. a social networking software, running on the paying terminal, so that the paying account identifier and the verification information can be acquired through the communication account when the paying terminal logs in the communication account. In some embodiments, it is also feasible that only the paying account is bound to the communication account, while the verification information or at least part of the verification information is not bound to the communication account, and part of all of the verification information may be received from input during payment.

In some embodiments, before Step S203, the method may further include: the paying terminal acquiring a pre-stored paying account identifier and verification information associated with the paying account.

In this way, a paying account and verification information related to the paying account can be acquired quickly, to quickly complete the payment process.

In some embodiments, before Step S203, the method may further include: the paying terminal acquiring a pre-stored paying account, and receiving input verification information associated with the paying account.

In this way, a paying account identifier can be acquired quickly, and because verification information associated with the paying account is from input, payment security is improved.

In some embodiments, before Step S203, the method may further include:

The paying terminal receiving a paying account identifier from input and verification information associated with the paying account from input.

As both the paying account and the verification information are from input, payment security is ensured.

S204: The bank server processes the payment request; S204-1, the bank server sends processing results of processing the payment request to the paying terminal; and S204-2, the bank server sends processing results to the selling terminal.

In some embodiments, the processing results may include an approval, indicating that the payment is successful. For example, the processing results may include a message indicating that a payment amount in the paying account is transferred to the selling account. Alternatively, the processing results may include a denial, indicating that the payment fails. For example, the processing results may include a message indicating that a payment amount in the paying account is not transferred to the selling account.

In some embodiments, after Step S204, the method may further include the following steps:

S205: The selling terminal displays the processing results.

When the processing results indicate that the payment is successful, the selling terminal may display information indicating that the payment is successful. For example, the selling terminal may display text showing that the payment is successful, or play audio indicating that the payment is successful. After receiving the information indicating that the payment is successful, the seller can deliver the article corresponding to the payment to the payer. When the processing results show that the payment fails, the selling terminal may display information indicating that the payment fails. For example, the selling terminal may display text showing that the payment fails, or play audio indicating that the payment fails. After receiving the information indicating that the payment fails, the seller may not deliver the article corresponding to the payment to the payer, prompt the payer to pay again or pay through another means, or cancel the transaction.

S206: The paying terminal displays the processing results.

When the processing results indicate that the payment is successful, the paying terminal may display information indicating that the payment is successful. For example, the paying terminal may display text showing that the payment is successful, or play audio indicating that the payment is successful. After receiving the information indicating that the payment is successful, the payer can take the article corresponding to the payment from a shop of the seller. When the processing results show that the payment fails, the paying terminal may display information indicating that the payment fails. For example, the paying terminal may display text showing that the payment fails, or play audio indicating that the payment fails. After receiving the information indicating that the payment fails, the seller may payer may pay again, pay through another means, or cancel the transaction.

In some embodiments, when the payment amount included in the payment information is large—for example, the payment amount exceeds a certain preset value—the paying terminal or the server may further perform identity verification, that is, when the payment amount exceeds the preset value, payment can be made only when the identity verification is successful.

In some embodiments, after Step S202 and before Step S203, the method may further include: when a payment amount included in the payment information exceeds a preset value, the paying terminal may display prompt information to urge the user to enter information for identity verification.

In some embodiments, the paying terminal may acquire identity verification information, e.g. scanning a body part of the user for biometric information, and the paying terminal may authenticate the identity verification information. Alternatively, the identity verification information may be processed by the bank server. The identity verification information refers to information that can be used to verify the identity of the user and to determine whether the user is associated with the paying account—whether the user is authorized to transfer funds in the paying account. In some embodiments, the identity verification information may be a pass code or a other information that can be entered by the user. In some embodiments, the identity verification information is biometric information related to biometrics such as but not limited to: finger print, iris, face features, voice print, nucleotide such as DNA, palm print, hand geometry, retina, and odor/scent. In some embodiments, the biometric information is acquired by scanning a body part, e.g. finger print, iris, face, palm, hand, or retina.

In some embodiments, in Step S203, if the identity verification conducted by the paying terminal is successful—showing that user is associated with the paying account, the paying terminal may send a payment request including a paying account and verification information to a bank server according to the payment information, wherein the verification information includes a confirmation that the identity verification is successful.

In some embodiments, after acquiring the payment information, the paying terminal determines whether the payment amount of the payment information exceeds the preset value, and if not, no identity verification is performed; if yes, prompt information for prompting identity verification is displayed, and the paying terminal acquires identity verification information, e.g. by scanning a body part for biometric information; and the paying terminal authenticates the identity verification information. For example, the paying terminal outputs a user interface for scanning fingerprints, a user presents his/her fingerprint in the interface, the paying terminal scans the fingerprint to obtain fingerprint information, the paying terminal compares the fingerprint information with fingerprint information previously input by a payer, and when the two pieces of fingerprint information are consistent, it is considered that the identity verification is successful and user is associated with the paying account, and Step S203 is performed. In this way, payment security can be improved while the payment speed is ensured because in actual applications, the amount paid by a user for purchasing an article may be low and it is unnecessary to perform identity verification for some cases, whereas identity verification is performed only in large-amount payment.

In some embodiments, it is also possible to set different standards for identity verification. For example, the identity verification can be conducted randomly so that the user cannot predict whether he/she will be verified for a particular transaction. In some embodiments, the identity verification can be conducted only when the payment amount is lower than a preset amount. In some embodiments, the identity verification is only conducted when the payment is within a certain range.

In some embodiments, the identity verification may be conducted by the bank server. The verification information sent by the paying terminal to the bank server may include the identity verification information, such as the biometric information. The bank server may compare the identity verification information with information stored with the bank server. The identity verification may be considered part of an overall verification process performed by the bank server.

In some embodiments, the identity verification may be performed by both the paying terminal and the bank server. For example, when the payment amount included in the payment information is excessively large, e.g. exceeding a certain preset value, the bank server may further perform identity verification in addition to the identity verification conducted on by the paying terminal. The same of different identity verification information may be used by the bank server and the paying terminal. For example, the paying terminal may verify the biometric information and the bank server may verify a pass code entered by the user. Payment transfer can be made only when both identity verifications are successful.

In some embodiments, after Step S202 and before Step S203, the method may further include: when a payment amount included in the payment information exceeds a preset value, the paying terminal displaying prompt information for prompting identity verification; and the paying terminal scanning a body part for identity verification, to obtain identity verification information, e.g. biometric information.

Step S203 may include: the paying terminal sends a payment request including the payment information and verification information, wherein the verification information includes the identity verification information, e.g. biometric information, to the bank server according to the payment information.

Step S204 may include: the bank server authenticating the identity verification information and other verification information, if any, and processing the payment request when the verification passes.

In some embodiments, before performing identity verification, the bank server may receive identity registration information input by the payer who sets up or re-configures the paying account. When it is necessary to conduct identity verification, e.g. when the paying account has a large-amount payment, the payment request is processed after successful comparison of the identity verification information sent by the paying terminal and the identity registration information, so as to improve security.

In some embodiments, the step of acquiring biometric information may comprise obtaining information related to: finger print, iris, face features, voice print, nucleotide such as DNA, palm print, hand geometry, retina, and odor/scent, of the user. In some embodiments, acquiring biometric information may comprise scanning a body part of the user by the paying terminal, wherein the body part may be selected from: finger print, iris, face, palm, hand geometry, and retina.

In some embodiments, a fingerprint sensor may be used to scan fingerprints, to obtain fingerprint information.

In some embodiments, a camera may be used to scan all or part of an iris, to obtain iris information.

In some embodiments, a camera may be used to scan all or part of an retina, to obtain iris information.

In some embodiments, a camera may be used to scan all or part of a face, to obtain face information.

The fingerprint information, the iris information, the retina information and/or the face information may be used as identity verification information.

In some embodiments, the identity verification information acquired in this embodiment includes, but is not limited to, the above identity verification information.

In the above technical solution, multiple embodiments are introduced on the basis of the above embodiments, and these embodiments may improve payment speed and/or payment security.

Figure 3:
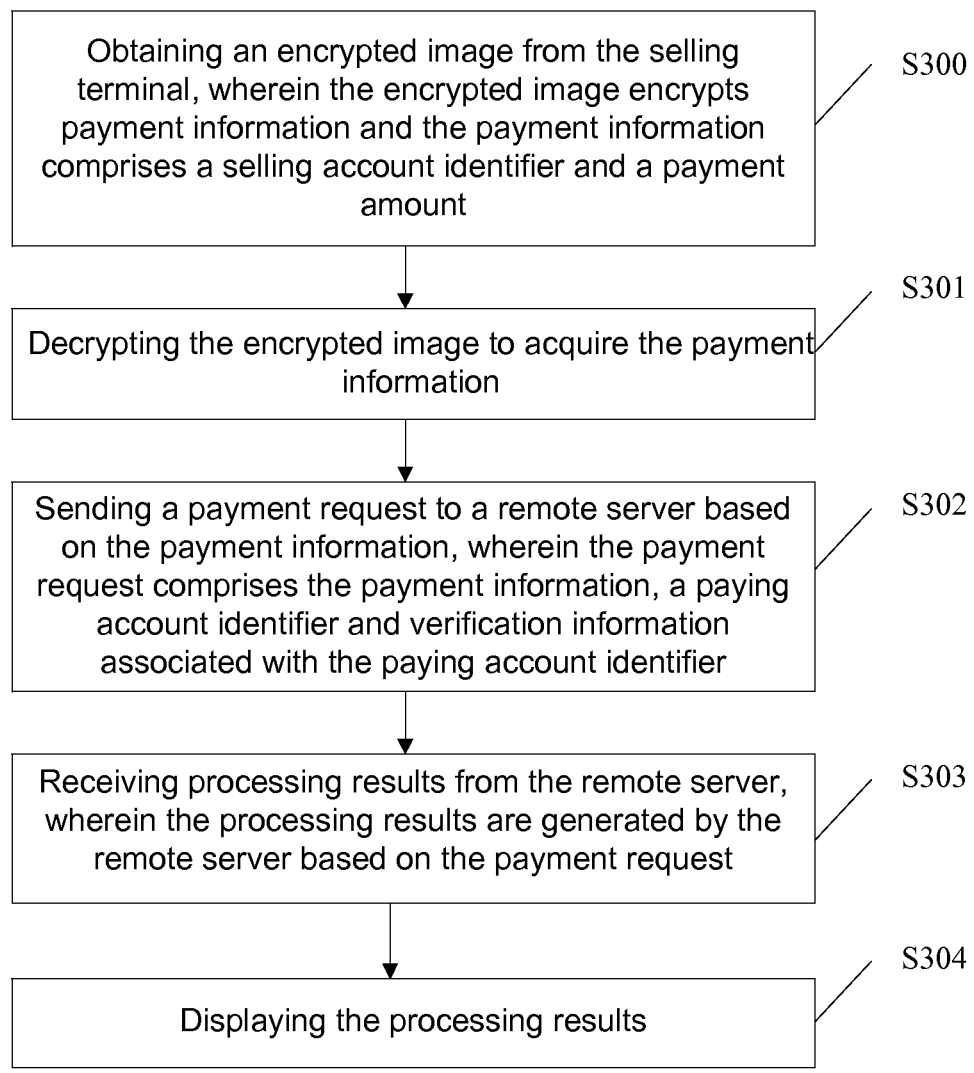
FIG. 3 is a flowchart illustrative of the information transmission method according to some embodiments of the present application.

Referring to FIG. 3, FIG. 3 is a flowchart illustrative of the information transmission method according to some embodiments of the present application. As shown in FIG. 3, the method, which may be conducted by a paying terminal, may include the following steps:

S300: Obtaining an encrypted image from the selling terminal, wherein the encrypted image encrypts payment information and the payment information comprises a selling account identifier and a payment amount. The encrypted image may be generated by the selling terminal, displayed and/or sent by the selling terminal, and acquired and/or received by the paying terminal.

S301: Decrypting the encrypted image to acquire the payment information.

S302: Sending a payment request to a remote server based on the payment information, wherein the payment request comprises the payment information, a paying account identifier and verification information associated with the paying account identifier.

S303: Receiving processing results from the remote server, wherein the processing results are generated by the remote server based on the payment request.

In some embodiments, the payment information may include information related to a target article of merchandise.

In some embodiments, the encrypted image may be generated basing entirely or partly on input from a user. In some embodiments, the encrypted image may be generated by scanning a graphic code on the target article merchandise or service. The information related to the target article may include a payment amount for the price of the target article. The information related to the target article may also include but not be limited to the source of the article, a brief description of the article, and/or a link to a description of the article.

In some embodiments, the processing results may include an approval and a message that the payment is successful. For example, the message may indicate that the payment amount in the paying account is transferred to the selling account. Alternatively, the processing results may include a denial and a message that the payment fails. For example, the message may indicate that a payment amount in the paying account is not transferred to the selling account.

Step S303: Displaying the processing results.

When the processing results indicate that the payment is successful, the paying terminal may display information indicating that the payment is successful. For example, the paying terminal may display text showing that the payment is successful, or play audio indicating that the payment is successful. After receiving the information indicating that the payment is successful, the payer can take the article corresponding to the payment from a shop of the seller. When the processing results show that the payment fails, the paying terminal may display information indicating that the payment fails. For example, the paying terminal may display text showing that the payment fails, or play audio indicating that the payment fails. After receiving the information indicating that the payment fails, the seller may payer may pay again, pay through another means, or cancel the transaction.

It should be noted that, the method can be applied to the selling terminal described in a similar manner as in the above embodiments. Besides, operations performed by the paying terminal and implementation manners, in all or in part, can be performed by the selling terminal, and description is not repeated herein.

Figure 4:
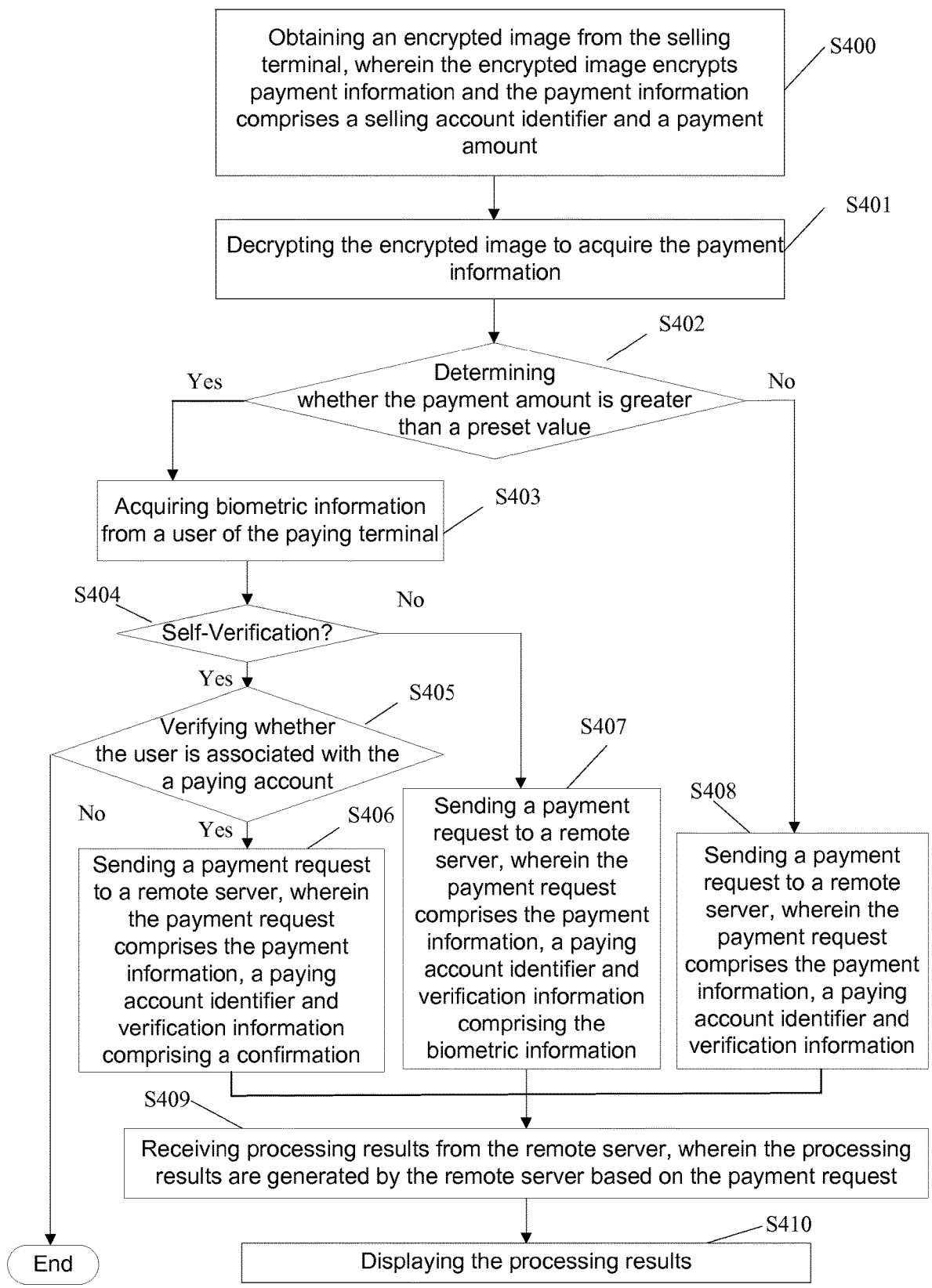
FIG. 4 is a flowchart illustrative of the information transmission method according to some embodiments of the present application, showing more details and options.

Referring to FIG. 4, FIG. 4 is a flowchart illustrative of the information transmission method according to some embodiments of the present application, showing more details and options. As shown in FIG. 4, the method may be conducted by the paying terminal and include the following steps:

S401: Obtaining an encrypted image from the selling terminal, wherein the encrypted image encrypts payment information and the payment information comprises a selling account identifier and a payment amount. In some embodiments, the payment information may also include a bank server identifier.

S401: Decrypting the encrypted image to acquire the payment information. After decrypting the encrypted image, the paying terminal is able to identify the selling terminal. In some embodiments, the bank server is a default server. In some embodiments, the bank server is identified using the bank server identifier included in the payment information. In some embodiments, the selling account identifier is an identifier associated with a communication software account associated with the selling account and selling terminal. For example, the selling account identifier may be a user name of the user for the communication software that is bound to/associated with the selling terminal.

S402: Determining whether the payment amount is greater than a preset value. This step may be used to determine whether additional verification, e.g. identity verification, is necessary. If the payment amount is not greater than the preset value, the method proceeds to step S408, avoiding additional verifications, e.g. identity verification directed to determine whether the user is associated with the paying account—whether the user has the authority to transfer funds in the paying account. If the payment amount is greater than the preset value, the method proceeds to steps S403-S407, going through additional verification, especially identity verification.

S408: Sending a payment request to a remote server, wherein the payment request comprises the payment information, a paying account identifier and verification information. Here, the verification information does not include the identity verification information and the bank server does not need to conduct identity verification for the user. In some embodiments, the paying account identifier is an identifier associated with a communication software account associated with the paying account and paying terminal. For example, the paying account identifier may be a user name of the user for the communication software that is bound to/associated with the paying terminal. The bank server proceeds to process the payment request after identifying the paying account and selling account.

S403: Acquiring biometric information from a user of the paying terminal. The biometric information may be considered a specific example of identity verification information, as described above. The biometric information may be related to biometrics such as but not limited to: finger print, iris, face features, voice print, nucleotide such as DNA, palm print, hand geometry, retina, and odor/scent. In some embodiments, the biometric information is acquired by scanning a body part, e.g. finger print, iris, face, voice print, palm print, hand geometry, and retina. In some embodiments, the paying terminal may acquire other forms of identity verification information such as a pass code.

S404: Determining whether to conduct the identity verification with the paying terminal. If yes, the paying terminal proceeds to steps S405 and S406. If no, the paying terminal proceeds to step S407. In some embodiments, the paying terminal may further determine whether the payment amount is larger than a second preset value, which is higher than the preset value used in step S402. If the answer is yes, the identity verification can be conducted by the bank server, ensuring additional safety. If the answer is no, the identity verification can be conducted by the paying terminal. In some embodiments, the identity verification is conducted automatically by the paying terminal. In some embodiments, the identity verification is conducted automatically by the bank server.

S407: Sending a payment request to a remote server, wherein the payment request comprises the payment information, a paying account identifier and verification information comprising the biometric information. Here the bank server may conduct identity verification for the user and determine whether the user is associated with the paying account and whether the user is authorized to transfer funds in the paying account. The bank server may conduct the identity verification based on the biometric information in the verification information. In addition, the bank server may conduct additional verification, if necessary based on verification information other than the biometric information. The bank server proceeds to process the payment request if the all the verifications are successful.

S405: Verifying whether the user is associated with the a paying account based on the biometric information. Verification can be conducted by comparing the biometric information entered by the user with the biometric information pre-stored in the paying terminal. If verification is successful, paying terminal proceeds to step S406. If the verification is not successful, the user is not authorized to transfer funds in the paying account and the transaction is terminated. Alternatively, when the verification is not successful, the paying terminal may display a warning or notice and allow the user to re-enter the identity verification information, e.g. using the paying terminal to re-scan a body part to acquire new biometric information.

S406: Sending a payment request to a remote server, wherein the payment request comprises the payment information, a paying account identifier and verification information comprising a confirmation. Since the identity verification conducted in step S405 is successful, the paying terminal determines that the user is authorized to transfer funds in the paying account and the paying terminal may generate a confirmation and send the confirmation as part of the verification information. The bank server may receive the confirmation and take into consideration that the identity of the user has already been verified. In some embodiments, the bank server may conduct no further verifications and start to process the payment request. In some embodiments, the bank server may conduct further verification based on the verification information other than the confirmation.

S409: Receiving processing results from the remote server, wherein the processing results are generated by the remote server, e.g. bank server, based on the payment request.

After steps S406, S407, or S408, and after the bank server verifies the verification information, the bank server may process the payment request, which may involved steps such as but not limited to: identifying the paying account, identifying the selling account, ascertaining the amount of funds in the paying account, ascertaining the payment amount, and comparing the amount of funds in the paying account to the payment amount. As indicated, the processing results may include an approval or a denial of the payment request. In some embodiments, the processing results include a denial when the verification information associated with the paying account identifier verifies that the paying account contains insufficient fund for the payment amount. In some embodiments, the processing results include an approval when the remote server determines that the paying account contains sufficient fund for the payment amount. The processing results may also include other contents, such as but not limited to: a message to be displayed by the paying terminal or selling terminal that the payment is successful or not. In generating the processing results, the bank server may also conduct the transaction when the processing results include an approval.

S410: The paying terminal may display the processing results. In some embodiments, the processing results include an approval and the paying terminal notifies the user by displaying the processing results and indicating that the transaction has been completed. In some embodiments, the process results include a denial and the paying terminal displays the processing results so that the user may try again or cancel the transaction.

It should be noted that, the method can be applied to the selling terminal described in the above embodiments, and operations selected by the selling terminal and implementations can be applied to the method. The descriptions are not limiting the applications and the implementations.

Illustration is given below with a specific implementation.

Figures 5A, 5B, 5C:
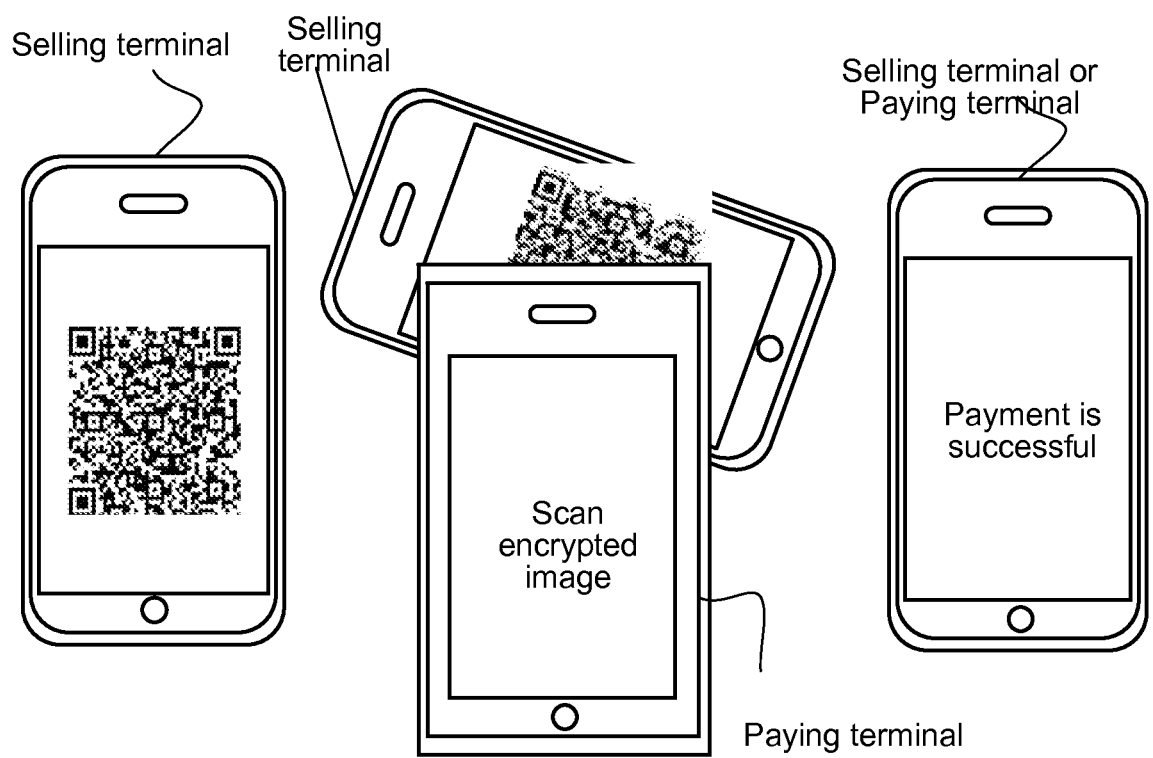
FIGS. 5A, 5B, and 5C are exemplary screen shots of the paying terminal and/or the selling terminal according to some embodiments of the present application.

FIGS. 5A, 5B, and 5C are exemplary screen shots of the paying terminal and the selling terminal according to some embodiments of the present application. In some embodiments, a payer selects a target article of merchandise from a seller; the seller uses a selling terminal to generate an encrypted image encoding payment information corresponding to the target article; as shown in FIG. 5A, the encrypted image is displayed by the selling terminal; as shown in FIG. 5B, the payer uses a paying terminal to scan the encrypted image displayed by the selling terminal; the paying terminal decrypts the encrypted image to obtain the payment information, and sends a payment request to a bank server according to the payment information; the bank server processes the payment request, and sends processing results to the paying terminal and the selling terminal; the paying terminal and/or the selling terminal receives the processing results and the processing results indicates that the payment is successful, as shown in FIG. 5C; the seller knows that the payment is successful, and delivers the target article to the payer, to complete trading of the target article.

FIGS. 6-11 illustrate the devices and systems that may be used to perform the methods described above. To avoid redundancy, not all the details and variations described for the method are herein included for the devices and systems. Such details and variations should be considered included for the description of the devices and as long as they are not in direct contradiction to the specific description provided for the devices and systems.

Figure 6:
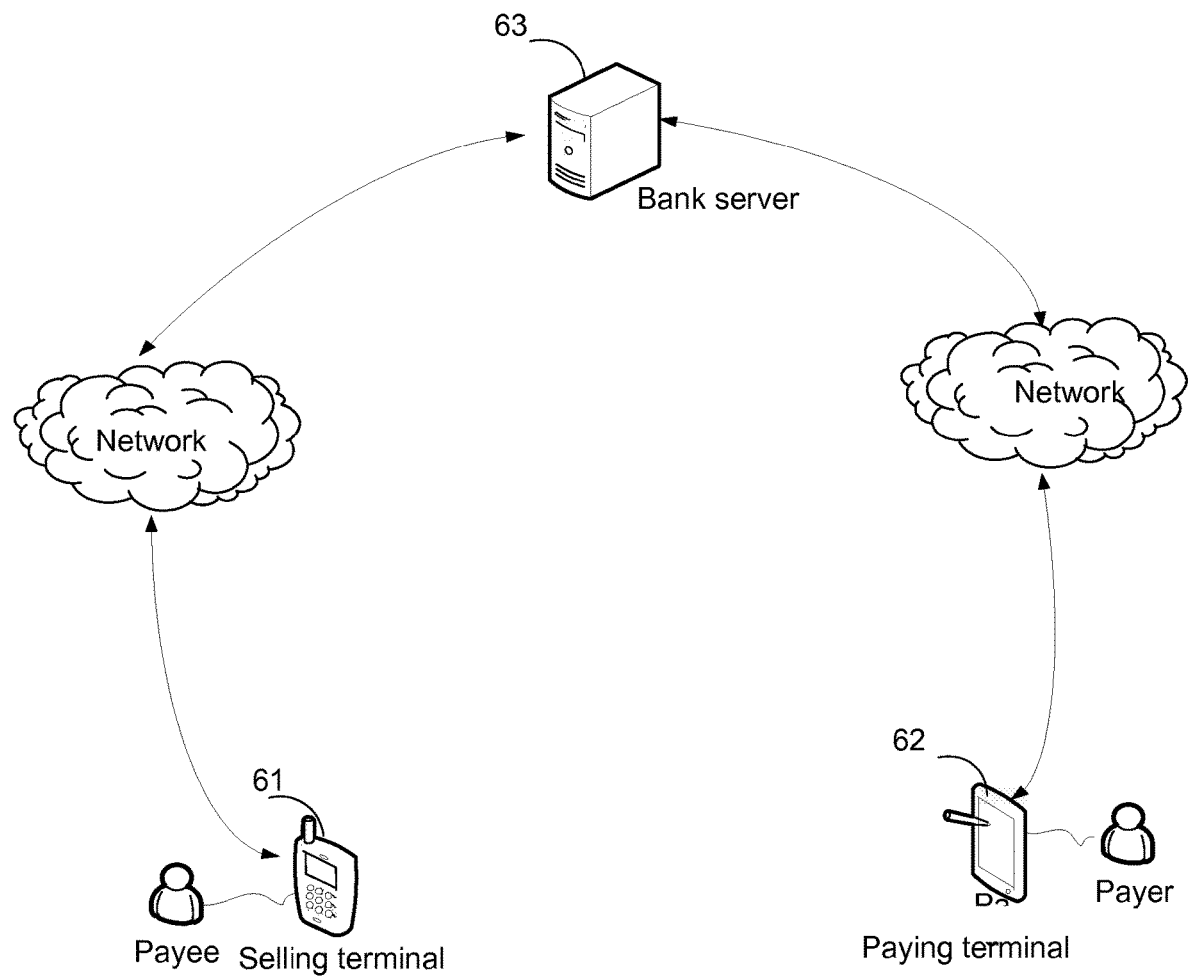
FIG. 6 is a schematic structural diagram of an information transmission system according to some embodiments of the present application, showing the network environment.

FIG. 6 is a schematic structural diagram of an information transmission system according to some embodiments of the present application, showing the network environment. As shown in FIG. 6, the system comprises: a selling terminal 61, a paying terminal 62, and bank server 63, wherein the terminals and servers are connected with a network.

In some embodiments, the selling terminal 61 may display an encrypted image encoding payment information through an application program, and then the paying terminal 62 acquires the encrypted image displayed by the selling terminal 61. The payment information may include a payment amount, or the payment information may include a payment amount and a selling account identifier. The payment information may also include information related to an article of merchandise or services. When the payment information does not include a selling account identifier, the paying terminal 62 may acquire information of the application program displaying the encrypted image and then find the selling account according to the application program information. For example, the paying terminal 62 establishes a corresponding relationship between application program information and a selling account in advance, so that the paying terminal 62 can identify the selling account by using the correspondence. In some embodiments, the paying terminal 62 may not identify the selling account. For example, the selling account is found by using a terminal identifier of the selling terminal 61 when the bank server 63 processes a payment request.

In some embodiments, the payment information may correspond to a certain article of merchandise. For example, when a user of the paying terminal 62 chooses to purchase a target article, the selling terminal 61 may generate an encrypted image encoding payment information corresponding to the target article, that is, the payment information may include price information of the target article.

The paying terminal 62 may be used for acquiring the encrypted image encoding payment information and displayed by the selling terminal 61, and decrypting the encrypted image to acquire the payment information; the paying terminal may be used for sending a payment request including a paying account and verification information related to the paying account to the bank server 63 according to the payment information.

In some embodiments, when the paying terminal 62 acquires the payment information, the paying terminal 62 can identify a paying account and verification information related to the paying account, and then sends a payment request including the paying account identifier and the verification information related to the paying account to the bank server 63 according to the payment information. For example, the paying terminal 62 sends a payment request including the payment information, a paying account, and verification information related to the paying account to the bank server 63.

In some embodiments, the payment request may include a paying account and verification information related to the paying account that the paying terminal 62 sends to the bank server 63 may be a payment request including a paying account and verification information related to the paying account sent to the bank server 63 via a wired or wireless network.

The bank server 63 may be used for processing the payment request, and sending processing results to the paying terminal 62 and the selling terminal 61.

In some embodiments, after the bank server 63 receives the payment request, the bank sever 63 can authenticate the verification information related to the paying account included in the payment request. For example, the bank server 63 may compare the verification information with verification information related to the paying account stored at the bank server 63, when the comparison result is that the two pieces of verification information are consistent, it is considered that the verification is successful, and a payment operation is performed when the verification is successful. For example, a payment amount in the paying account is transferred to a selling account. The selling account may be identified by a selling account identifier included in the payment request, or found by the bank server 63 according to a terminal identifier of the selling terminal 61.

In some embodiments, the bank server 63 sending processing results of processing the payment request to the paying terminal 62 and the selling terminal 61 may send processing results to the paying terminal 62 by using a terminal identifier of the paying terminal 62 and send the processing results to the selling terminal 61 by using a terminal identifier of the selling terminal 61. For example, the payment request may include a terminal identifier of the selling terminal 61, or the payment request carries a selling account and the bank server 63 finds the terminal identifier of the selling terminal 61 by using the selling account.

In some embodiments, the paying terminal 62 can acquire an encrypted image encoding payment information and being displayed by the selling terminal 61, the selling terminal 62 can send a payment request to the bank server 63 according to the payment information included in the encrypted image, and the bank server 63 can perform payment processing. That is, payment can be completed as long as the paying terminal 62 acquires the encrypted image displayed by the selling terminal 61. For example, when a user of the paying terminal 62 purchases a certain article of merchandise being sold by a seller using the selling terminal 61, the seller only needs to use the selling terminal 61 to display an encrypted image encoding payment information including information related to the article, and the payer uses the paying terminal 62 to acquire the encrypted image; the paying terminal 62 can send a payment request to the bank server 63 according to the payment information included in the encrypted image, the bank server 63 can perform payment processing, and when the selling terminal 61 receives a payment complete message, the seller can deliver the article to the payer, thereby completing purchase of the article. That is, in the transaction process, to complete the transaction, the seller only needs to use the selling terminal 61 to display an encrypted image, and the payer only needs to use the paying terminal 62 to acquire the encrypted image. Therefore, the transaction can be completed quickly and conveniently while the transaction security is ensured.

In some embodiments, the selling terminal 61 may further be used for generating an encrypted image encoding payment information including information corresponding to a target article of merchandise, and displaying the encrypted image.

In some embodiments, the selling terminal 61 may receive an input by a user and generate an encrypted image encoding payment information corresponding to a target article. For example, according to a target article that a payer of the paying terminal 62 chooses to purchase, a seller using the selling terminal 61 may use the selling terminal 61 to generate an encrypted image encoding payment information corresponding to the target article. The selling terminal 61 may further acquire a graphic logo on the target article, and generate an encrypted image encoding payment information corresponding to the target article according to the graphic logo. The payment information corresponding to the target article may be payment information including a payment amount for the price of the target article.

In some embodiments, the paying terminal may generate the encrypted image through a specific application, so as to quickly generate the encrypted image, and increase payment efficiency.

In some embodiments, the paying terminal 62 may send a payment request including the payment information, a paying account identifier, and verification information related to the paying account to the bank server 63, where the payment information may include a payment amount and a selling account identifier. In some embodiments, the paying terminal 62 may send a payment request including the payment information, a selling account identifier, a paying account identifier, and verification information related to the paying account to the bank server 63, where the payment information may include a payment amount, and the selling account identifier may be used to identify a selling account acquired in advance. For example, before a transaction between the paying terminal 62 and the selling terminal 61, the paying terminal 62 identifies a selling account by communicating with the selling terminal 61, or the paying terminal 62 identifies the selling account by receiving an operation input by a user. This embodiment does not limit the manner of acquiring a selling account.

In some embodiments, before the paying terminal sends the payment request, the paying terminal 62 may further identify the paying account and acquire the verification information related to the paying account. For example, the paying account identifier and the verification information related to the paying account are pre-stored at the paying terminal 62. For example, the paying account and the verification information related to the paying account are bound to or associated with a communication account of communication software, e.g. a social networking software, running on the paying terminal 62, so that the paying account and the verification information related to the paying account can be acquired through the communication account when the paying terminal 62 logs in the communication account. In some embodiments, it is also feasible that only the paying account is bound to the communication account, while verification information related to the paying account is not bound to the communication account, and input verification information related to the paying account is received during payment.

For example, the paying terminal 62 may further be used to identify a pre-stored paying account and verification information related to the paying account. In this manner, a paying account and verification information related to the paying account can be identified and/or acquired quickly, so as to quickly complete the payment process.

In some embodiments, the paying terminal 62 may further be used to identify a pre-stored paying account, and receiving input from user for verification information related to the paying account. In this manner, a paying account can be identified quickly. Verification information related to the paying account needs to be input. For example, the paying terminal 62 receives verification information, which is input by a payer, of the paying account, payment security is improved.

In some embodiments, the paying terminal 62 may further be used for receiving input to identify the paying account and the verification information related to the paying account.

As both the paying account and the verification information related to the paying account are identified and/or acquired based on input. For example, the paying terminal 62 receives input from a user (payer) to identify a paying account and verification information related to the paying account, payment security can be improved.

In some embodiments, the processing results may include an approval and a message indicating that the payment is successful. For example, the message may show that a payment amount in the paying account is transferred to the selling account. In addition, the processing results may further include a denial and a message indicating that the payment fails. For example, the message may show a payment amount in the paying account is not transferred to the selling account.

In some embodiments, the selling terminal 61 may further be used for displaying and/or outputting the processing results.

When the processing results indicate that the payment is successful, the selling terminal 61 may display information indicating that the payment is successful. For example, the selling terminal may display text showing that the payment is successful, or play audio indicating that the payment is successful. After receiving the information indicating that the payment is successful, the seller can deliver the article corresponding to the payment to the payer. When the processing results show that the payment fails, the selling terminal 61 may display information indicating that the payment fails. For example, the selling terminal may display text showing that the payment fails, or play audio indicating that the payment fails. After receiving the information indicating that the payment fails, the seller may not deliver the article corresponding to the payment to the payer, prompt the payer to pay again or pay through another means, or cancel the transaction.

In some embodiments, the paying terminal 62 may further be used for displaying and/or outputting the processing results.

When the processing results indicate that the payment is successful, the paying terminal 62 may display information indicating that the payment is successful. For example, the paying terminal may display text showing that the payment is successful, or play audio indicating that the payment is successful. After receiving the information indicating that the payment is successful, the payer can take the article corresponding to the payment from a shop of the seller. When the processing results show that the payment fails, the paying terminal 62 may display information indicating that the payment fails. For example, the paying terminal may display text showing that the payment fails, or play audio indicating that the payment fails. After receiving the information indicating that the payment fails, the seller may payer may pay again, pay through another means, or cancel the transaction.

In some embodiments, when the payment amount included in the payment information is excessively large. For example, the payment amount exceeds a certain preset value, the paying terminal 62 may further perform identity verification, that is, when the payment amount exceeds the preset value, payment can be made only when the identity verification is successful. For example, the paying terminal 62 may further be used for outputting prompt information for prompting identity verification when a payment amount included in the payment information exceeds a preset value.

The paying terminal 62 may further be used for acquiring biometric information, e.g. scanning a body part, for identity verification, to obtain identity verification information.

The paying terminal 62 or the bank server 63 may be used for authenticating the identity verification information.

The paying terminal 62 may further be used for sending a payment request including a paying account and verification information related to the paying account to a bank server 63 according to the payment information after the verification is successful.

For example, after acquiring the payment information, the paying terminal 62 determines whether a payment amount of the payment information exceeds a preset value, and if no, sends the payment request to the bank server 63; if the payment amount of the payment information exceeds the preset value, prompt information for prompting identity verification is output, and the paying terminal 62 scans a body part for identity verification, to obtain identity verification information; and the paying terminal 62 authenticates the identity verification information. For example, the paying terminal 62 outputs an interface for scanning fingerprints, a user inputs a fingerprint in the interface, and the paying terminal 62 scans the fingerprint to obtain fingerprint information; the paying terminal 62 compares the fingerprint information with fingerprint information previously input by a payer, and when the two pieces of fingerprint information are consistent, it is considered that the identity verification is successful, and the payment request is sent to the bank server 63. In this manner, the payment rate can be ensured while payment security is improved because in actual applications, the amount paid by a user for purchasing an article is generally low, that is, in general cases, it is unnecessary to perform identity verification, and identity verification is performed only in large-amount payment.

In some embodiments, when the payment amount included in the payment information is excessively large. For example, the payment amount exceeds a certain preset value, the bank server 63 may further perform identity verification, that is, when the payment amount exceeds the preset value, payment processing can be made only when the identity verification is successful. For example, the paying terminal 62 may further display prompt information to ask the user to enter identity verification when a payment amount included in the payment information exceeds a preset value.

The paying terminal 62 may further be used to acquire identity verification information, e.g. scan a body part of the user to acquire biometric information, to obtain identity verification information.

The paying terminal 62 may further be used for sending a payment request including payment information and verification information, which may include identity verification information and information related to the paying account to the bank server 63.

The bank server 63 may further be used for authenticating the identity verification information as well as other verification information, if any, and processing the payment request when verification is successful.

Specifically, before performing payment processing on the paying account, the bank server 63 receives identity verification information input by a payer who registers the paying account, and when the paying account has large-amount payment, a payment request is processed only when identity verification information sent by the paying terminal 62 and the identity verification information input by the payer who registers the paying account pass the verification, thereby improving security when the paying account has large-amount payment.

In some embodiments, the paying terminal 62 may be used for scanning fingerprints, to obtain fingerprint information. Specifically, a fingerprint sensor may be used to scan fingerprints, to obtain fingerprint information.

In some embodiments, the paying terminal 62 may be used for scanning iris, to obtain iris information. Specifically, a camera may be used to scan iris, to obtain iris information.

In some embodiments, the paying terminal 62 may be used for scanning retina, to obtain retina information. Specifically, a camera may be used to scan retina, to obtain retina information.

In some embodiments, the paying terminal 62 may further be used for scanning a face, to obtain face information. Specifically, a camera may be used to scan a face, to obtain face information.

Figure 7:
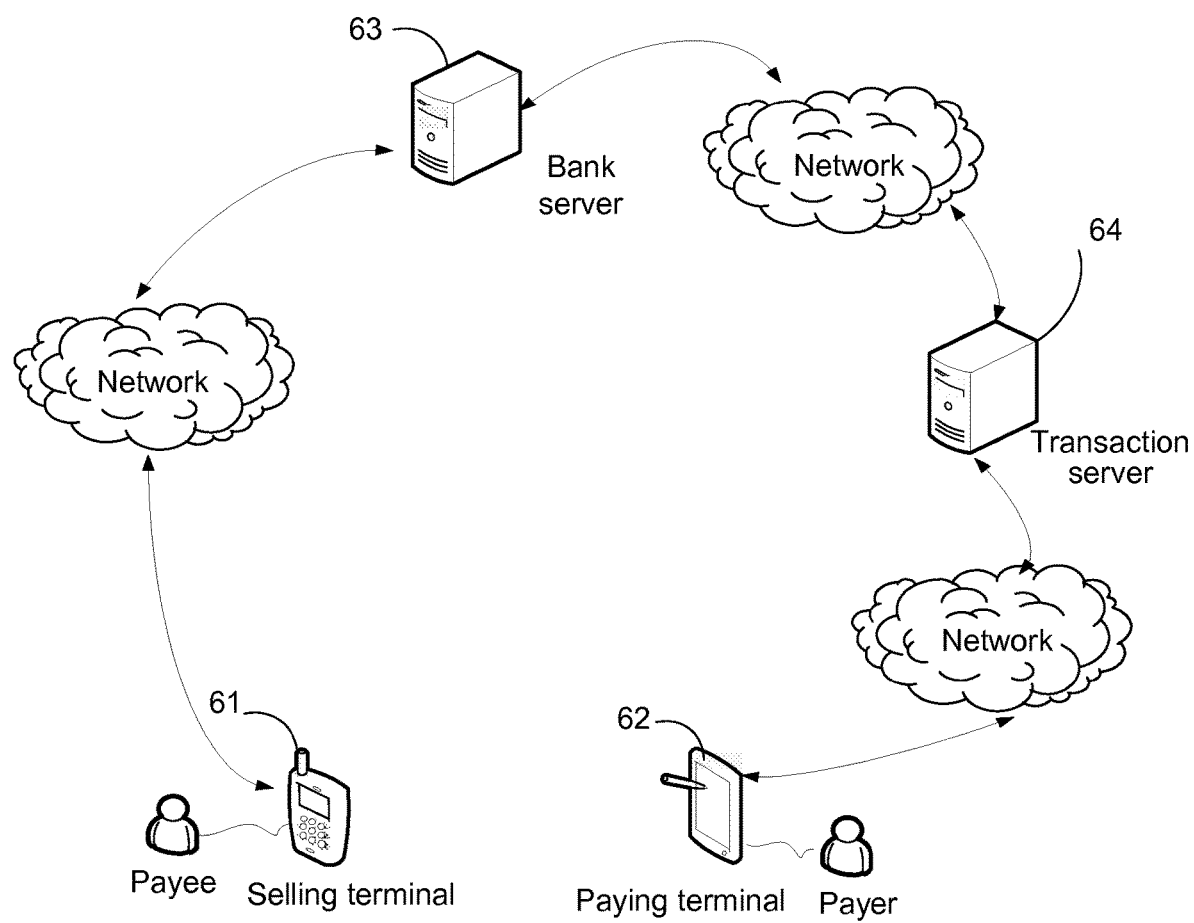
FIG. 7 is a schematic structural diagram of another information transmission system according to some embodiments of the present application, showing the network environment.

In some embodiments, as shown in FIG. 7, the system may further include a transaction server 64.

The paying terminal 62 may further send a payment request including a paying account and verification information related to the paying account to the bank server 63 through the transaction server 64. For example, the paying terminal 62 may further be used for sending a payment request including a paying account and verification information related to the paying account to the transaction server 64 according to the payment information.

The transaction server 64 is used for sending the payment request to the bank server 63.

The transaction server 64 may be a server providing certain application software running on the paying terminal 62. For example, when the paying terminal 62 acquires the encrypted image through certain communication software, e.g. a social networking software, and the paying account corresponds to a communication account of the communication software, the paying terminal 62 can identify the paying account and verification information related to the paying account through the communication software, and then sends a payment request including the paying account and the verification information related to the paying account to the transaction server 64, and the transaction server 64 sends the payment request to the bank server 63.

In some embodiments, the payment request is forwarded between the transaction server 64 and the bank server 63, and because it is more difficult to invade a server than a terminal, payment security can be improved in this implementation manner.

In some embodiments, a paying terminal acquires an encrypted image encoding payment information and displayed by a selling terminal, and decrypts the encrypted image to acquire the payment information; the paying terminal sends a payment request including the payment information and verification information related to the paying account to a bank server according to the payment information; and the bank server processes the payment request, and sends processing results of processing the payment request to the paying terminal and the selling terminal. In this manner, payment information can be obtained by acquiring an encrypted image, and thus, compared with the solutions in which payment information is acquired via a network, the embodiment of the present application can improve payment security.

Figure 8:
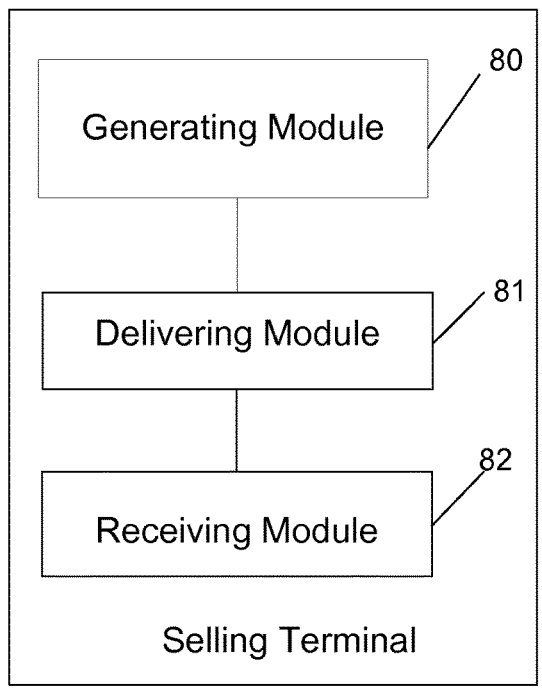
FIG. 8 is a block diagram of an information transmission apparatus, such as a selling terminal, according to some embodiments of the present application.

Referring to FIG. 8, FIG. 8 is a block diagram of an information transmission apparatus, such as a selling terminal, according to some embodiments of the present application. As shown in FIG. 8, the apparatus includes a generating module 80, a display module 81 and a receiving module 82.

The generating module 80 is configured to generate an encrypted image that encrypts payment information comprising a payment amount. In some embodiments, the payment information further comprises information related to merchandise and/or service to be purchased.

In some embodiments, the delivering module 81 is configured to display an encrypted image encoding payment information, so that a paying terminal may acquire the encrypted image and decrypts the encrypted image to acquire the payment information. In some embodiments, the delivering module 81 is configured to send the encrypted image in a message or email to the paying terminal. After receiving/acquiring the encrypted image, the paying terminal may send a payment request to a bank server according to the payment information; and the bank server may process the payment request.

The receiving module 82 is used for receiving processing results sent by the bank server.

In some embodiments, the apparatus may further include: an output module (not shown), for outputting the processing results.

In some embodiments, the apparatus is the selling terminal described in the above embodiments, and the apparatus can implement any operation performed by the selling terminal described in the above embodiments; description is not repeated herein.

In some embodiments, an encrypted image, e.g. a two-dimension code, encoding payment information is displayed, so that a paying terminal acquires the encrypted image and decrypts the encrypted image to acquire the payment information; the paying terminal sends a payment request to a bank server according to the payment information; the bank server processes the payment request; and processing results of processing the payment request sent by the bank server is received. In this manner, payment information can be obtained by acquiring an encrypted image, and thus, compared with of the solutions in which payment information is acquired via a network, the embodiment of the present application can improve payment security.

Figure 9:
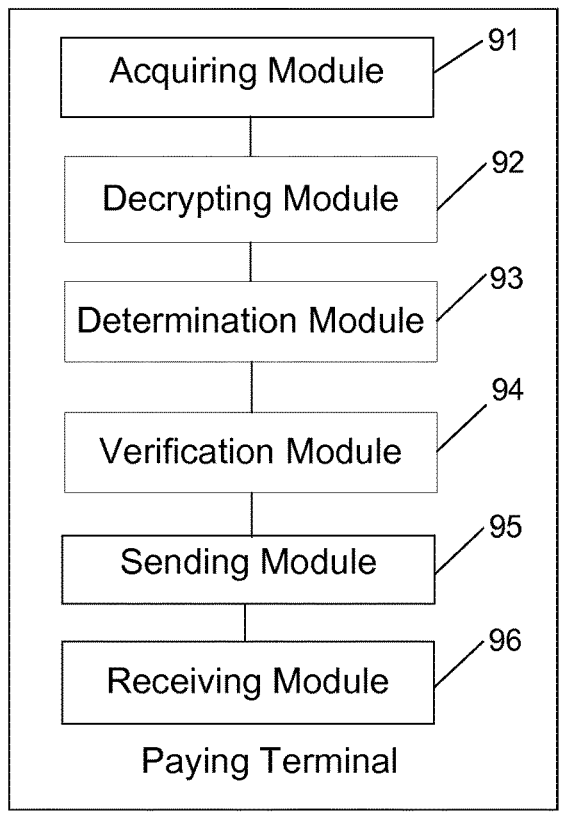
FIG. 9 is a block diagram of another information transmission apparatus, such as a paying terminal, according to some embodiments of the present application.

Referring to FIG. 9, FIG. 9 is a block diagram of another information transmission apparatus, such as a paying terminal, according to some embodiments of the present application. As shown in FIG. 9, the apparatus may include an acquiring module 91, a decrypting module 92, a determination module 93, a verification module 94, a sending module 95, and a receiving module 96.

The acquiring module 91 is configured to acquire an encrypted image encoding payment information and displayed by a selling terminal.

The decrypting module 92 is configured to decode the encrypted image to acquire the payment information.

The determination module 93 is configured to determine whether the payment amount is greater than a preset value.

In some embodiments, if the payment amount is greater than a preset value, the apparatus may conduct additional verification, such as identity verification of the user. The apparatus may thus include a verification module 94, which is configured to conduct the identity verification. The acquiring module 91 may be further configured to acquire biometric information from the user, e.g. scanning a body part of the user. The verification module 94 may then use the biometric information to determine whether the user is associated with the paying account—whether the user is authorized to transfer funds in the paying account. When the identity verification conducted by the paying terminal is successful, a confirmation may be included in the verification information sent to a remote server. In some embodiments, when the payment amount is greater than the preset value, the biometric information may be sent to a remote server so the remote server may conduct identity verification.

The sending module 95 is configured to send a payment request including a paying account and verification information to a remote server, e.g. a bank server, wherein the verification information may include the biometric information to be used for identity verification or a confirmation, indicating that identity verification has been successfully conducted by the paying terminal, so that the bank server may process the payment request.

The receiving module 96 is configured to receive processing results sent by the bank server.

In some embodiments, the apparatus may include: a first output module (not shown), for outputting prompt information for prompting identity verification when a payment amount included in the payment information exceeds a preset value.

In some embodiments, the apparatus may include: a second output module (not shown), for outputting prompt information for prompting identity verification when a payment amount included in the payment information exceeds a preset value; and a second identity information acquisition module (not shown), for scanning a body part for identity verification, to obtain identity verification information.

In the above technical solution, an encrypted image encoding payment information and displayed by a selling terminal is acquired, and the encrypted image is decrypted to obtain the payment information; a payment request including the payment information and verification information related to the paying account is sent to a bank server according to the payment information, so that the bank server processes the payment request; and processing results sent by the bank server is received. In this manner, payment information can be obtained by acquiring an encrypted image, improve payment convenience and security.

Figure 10:
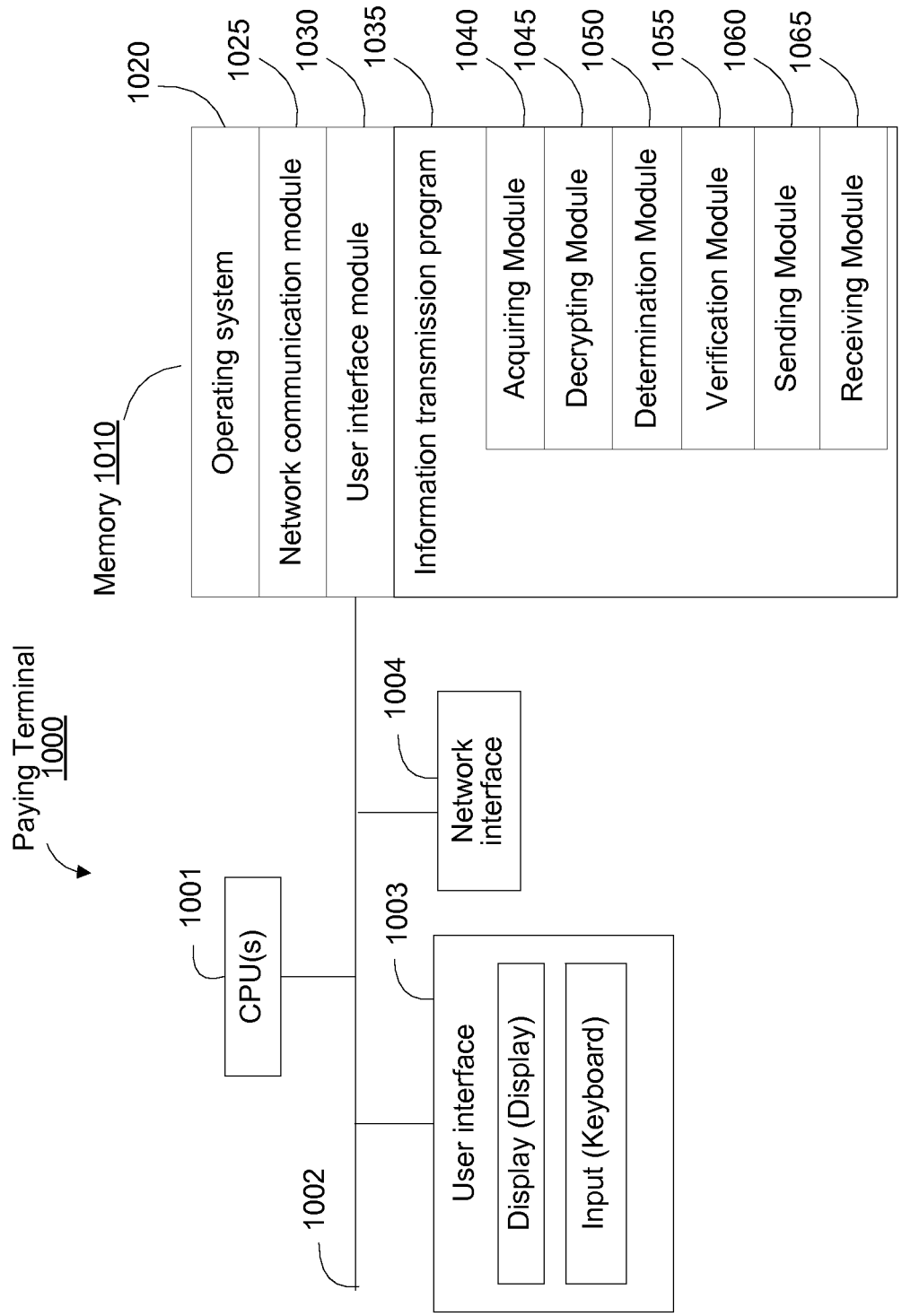
FIG. 10 is a schematic structural diagram of an information transmission apparatus, such as a paying terminal, according to some embodiments of the present application.

Referring to FIG. 10, FIG. 10 is a schematic structural diagram of information transmission apparatus, such as a paying terminal, according to some embodiments of the present application.

As shown in FIG. 10, the exemplary information paying terminal 1000 typically includes one or more processing units (CPU's) 1001, one or more network or other communications interfaces 1004, memory 1010, and one or more communication buses 1002 for interconnecting these components. The communication buses 1002 may include circuitry (sometimes called a chipset) that interconnects and controls communications between system components. The user interface 1003 may include a touch screen, or a display and a keyboard. In some embodiments, the user interface 1003 may further include a standard wired interface and wireless interface, e.g. a Wi-Fi interface. Memory 1010 may include high speed random access memory and may also include non-volatile memory, such as one or more magnetic disk storage devices. Memory 1010 may include mass storage that is remotely located from the CPU's 1001. In some embodiments, memory 810 stores the following programs, modules and data structures, or a subset or superset thereof:

an operating system 1020 that includes procedures for handling various basic system services and for performing hardware dependent tasks;

a network communication module 1025 that is used for connecting the paying terminal 1000 to the selling terminal, the server, and/or other computers via one or more communication networks (wired or wireless), such as the Internet, other wide area networks, local area networks, metropolitan area networks, and so on;

a user interface module 1030 configured to receive user inputs through the user interface 1003;

and one or more information transmission programs 1035 including a number of terminal-side application modules such as the following:

an acquiring module 91 configured to acquire an encrypted image encoding payment information and displayed by a selling terminal;

a decrypting module 92 configured to decode the encrypted image to acquire the payment information;

an optional determination module 93 configured to determine whether the payment amount is greater than a preset value;

an optional verification module 94 configured to conduct identity verification if the payment amount is greater than a preset value;

a sending module 95 configured to send a payment request including a paying account and verification information to a remote server; and a receiving module 96 configured to receive processing results sent by the bank server.

In some embodiments, the information transmission program 1035 may further include an output module configured to display the processing results with the display in the user interface 1003.

In some embodiments, the apparatus described in FIG. 10 can be applied to the selling terminal described in the above embodiments, and the apparatus can implement any operation performed by the selling terminal described in the above embodiments.

Figure 11:
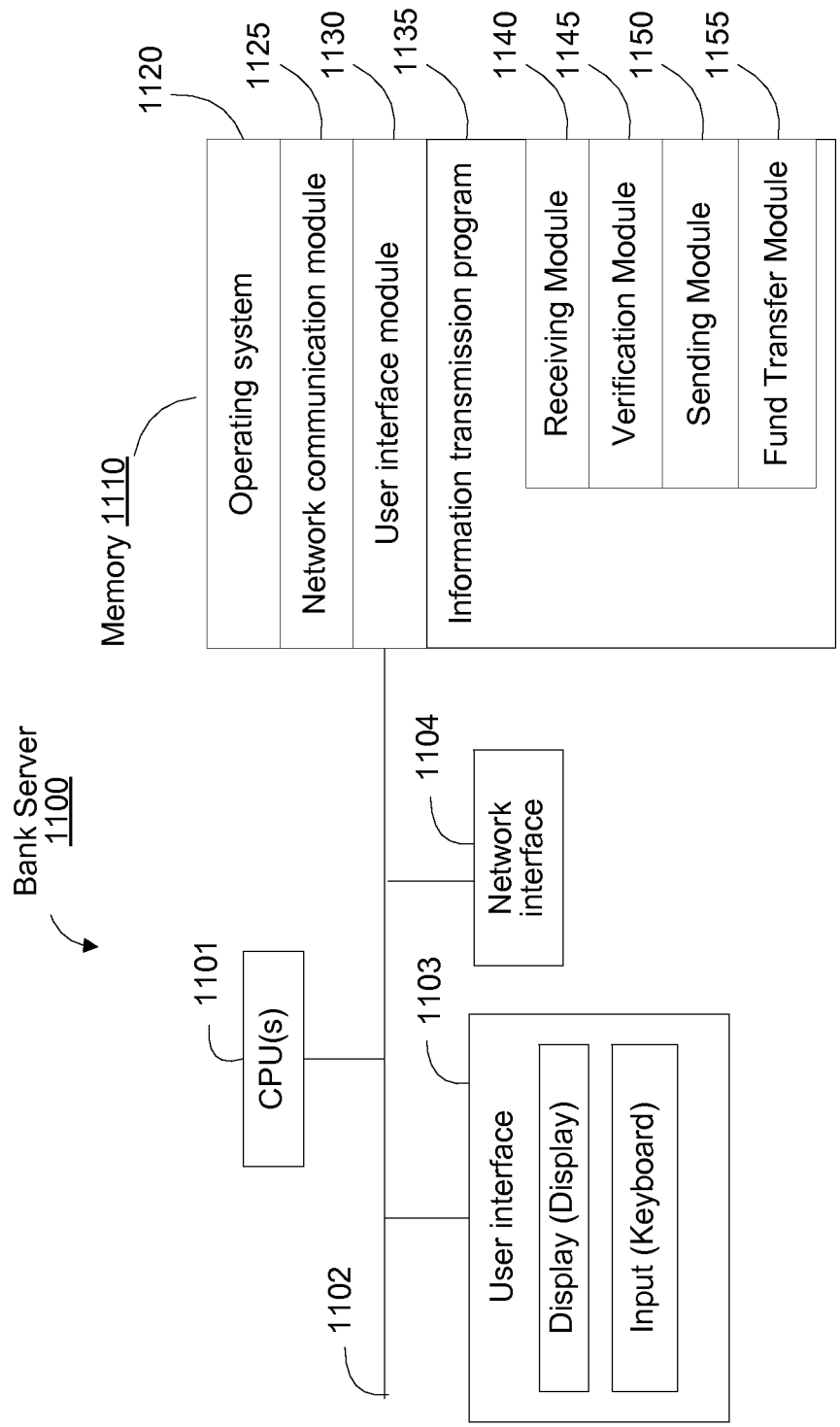
FIG. 11 is a schematic structural diagram of another information transmission apparatus, such as a server, according to some embodiments of the present application.

Referring to FIG. 11, FIG. 11 is a schematic structural diagram of another information transmission apparatus, such as a server, according to some embodiments of the present application. As shown in FIG. 11, the exemplary bank server 1100 typically includes one or more processing units (CPU's) 1101, one or more network or other communications interfaces 1104, memory 1110, and one or more communication buses 1102 for interconnecting these components. The communication buses 1102 may include circuitry (sometimes called a chipset) that interconnects and controls communications between system components. The user interface 1103 may include a touch screen, or a display and a keyboard. In some embodiments, the user interface 1103 may further include a standard wired interface and wireless interface, e.g. a Wi-Fi interface. Memory 1110 may include high speed random access memory and may also include non-volatile memory, such as one or more magnetic disk storage devices. Memory 1110 may include mass storage that is remotely located from the CPU's 1101. In some embodiments, memory 811 stores the following programs, modules and data structures, or a subset or superset thereof:

an operating system 1120 that includes procedures for handling various basic system services and for performing hardware dependent tasks;

a network communication module 1125 that is used for connecting the bank server 1100 to the paying terminal, the selling terminal, and/or other computers via one or more communication networks (wired or wireless), such as the Internet, other wide area networks, local area networks, metropolitan area networks, and so on;

a user interface module 1130 configured to receive user inputs through the user interface 1103;

and one or more information transmission programs 1135 including a number of terminal-side application modules such as the following:

a receiving module 1140 configured to receive a payment request from a paying terminal;

a verification module 1145 configured to verify the verification information in the payment request; in some embodiments, the verification module is configured to conduct identity verification based on biometric information as part of the verification information;

a sending module 1150 configured to send the processing results to the paying terminal and/or the selling terminal; and a fund transfer module 1155 configured to transfer the funds from the paying account to the selling account when the verification is successful.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for conducting a payment between a paying terminal, a selling terminal, and a remote server using a messaging communication platform, wherein the remote server is communicatively connected to the paying terminal and the selling terminal via the messaging communication platform, the paying terminal includes an information transmission program and the selling terminal includes an application program associated with the messaging communication platform, the paying terminal corresponds to a communication account registered in the messaging communication platform and is associated with a paying account having a paying account identifier, the method comprising:

generating, by the selling terminal using the application program associated with the messaging communication platform, an encrypted image including a selling account identifier and a payment amount, wherein the encrypted image is a two-dimensional code;

displaying, by the selling terminal using the application program associated with the messaging communication platform, the encrypted image;

scanning, by the paying terminal using the information transmission program, the encrypted image from the selling terminal;

decrypting, by the paying terminal using the information transmission program, the encrypted image and acquiring the selling account identifier and the payment amount from the decrypted image;

determining, by the paying terminal using the information transmission program, that the payment amount is greater than a preset value;

in response to the determination that the payment amount is greater than the preset value, acquiring, by the paying terminal using the information transmission program, biometric information from a user of the paying terminal, wherein the biometric information comprises fingerprint, iris, retina, and facial features;

comparing, by the paying terminal using the information transmission program, the acquired biometric information of the user of the paying terminal with information stored at the paying terminal and in association with the communication account registered with the messaging communication platform that is bound to the paying account associated with the paying terminal;

generating, by the paying terminal using the information transmission program, a confirmation that the user of the paying terminal is associated with the paying account based on the comparison;

in response to the generation of the confirmation:

sending, by the paying terminal using the information transmission program, a payment request to the remote server, wherein the payment request comprises the selling account identifier, the payment amount, the paying account identifier, and verification information associated with the paying account identifier;

receiving, by the paying terminal using the information transmission program, processing results from the remote server in response to the payment request; and displaying, by the paying terminal using the information transmission program, the processing results.

2. The method of claim 1, wherein:

the processing results received by the paying terminal include an approval or a denial of the payment request.

3. The method of claim 2, wherein:

the processing results received by the paying terminal include an approval of the payment request when the remote server determines that the paying account contains sufficient funds for the payment amount.

4. The method of claim 2, wherein:

the processing results received by the paying terminal include a denial of the payment request when the verification information associated with the paying account identifier determines that the paying account contains insufficient funds for the payment amount.

5. The method of claim 1, wherein:

the verification information comprises the biometric information.

6. The method of claim 2, wherein:

the remote server transfers the payment amount from the paying account to the selling account when the processing results received by the paying terminal include an approval of the payment request.

7. The method of claim 1, wherein:

the two-dimensional code further comprises merchandise information related to a merchandise associated with the selling account.

8. A paying terminal for conducting a payment, wherein the paying terminal communicates with a selling terminal and a remote server using a messaging communication platform, wherein the remote server is communicatively connected to the paying terminal and the selling terminal via the messaging communication platform, the paying terminal includes an information transmission program and the selling terminal includes an application program associated with the messaging communication platform, the paying terminal corresponds to a communication account registered in the messaging communication platform and is associated with a paying account having a paying account identifier, the paying terminal comprising:

one or more processors;

a memory; and one or more program instructions stored in the memory that, when executed by the one or more processors, cause the one or more processors to perform operations comprising:

scanning, by the paying terminal using the information transmission program, an encrypted image from the selling terminal, wherein the selling terminal generates the encrypted image using the application program associated with the messaging communication platform by encrypting a selling account identifier and a payment amount into the encrypted image, and the encrypted image is displayed on the selling terminal in the application program associated with the messaging communication platform, and the encrypted image is a two-dimensional code;

decrypting, by the paying terminal using the information transmission program, the encrypted image and acquiring the selling account identifier and the payment amount from the decrypted image;

determining, by the paying terminal using the information transmission program, that the payment amount is greater than a preset value;

in response to the determination that the payment amount is greater than the preset value, acquiring, by the paying terminal using the information transmission program, biometric information from a user of the paying terminal, wherein the biometric information comprises fingerprint, iris, retina, and facial features;

comparing, by the paying terminal using the information transmission program, the acquired biometric information of the user of the paying terminal with information stored at the paying terminal and in association with the communication account registered with the messaging communication platform that is bound to the paying account associated with the paying terminal;

generating, by the paying terminal using the information transmission program, a confirmation that the user of the paying terminal is associated with the paying account based on the comparison;

in response to the generation of the confirmation:

sending, by the paying terminal using the information transmission program, a payment request to the remote server, wherein the payment request comprises the selling account identifier, the payment amount, the paying account identifier, and verification information associated with the paying account identifier;

receiving, by the paying terminal using the information transmission program, processing results from the remote server in response to the payment request; and displaying, by the paying terminal using the information transmission program, the processing results.

9. The paying terminal of claim 8, wherein:
the processing results received by the paying terminal include an approval or a denial of the payment request.

10. The paying terminal of claim 8, wherein:
the two-dimensional code further comprises merchandise information related to a merchandise associated with the selling account.

11. The paying terminal of claim 9, wherein:
the processing results received by the paying terminal include an approval of the payment request when the remote server determines that the paying account contains sufficient funds for the payment amount.

12. The paying terminal of claim 9, wherein:
the processing results received by the paying terminal include a denial of the payment request when the verification information associated with the paying account identifier determines that the paying account contains insufficient funds for the payment amount.

13. The paying terminal of claim 8, wherein:
the verification information comprises the biometric information.

14. The paying terminal of claim 9, wherein:
the remote server transfers the payment amount from the paying account to the selling account when the processing results received by the paying terminal include an approval of the payment request.

\* \* \* \* \*